March 20, 1928.

F. L. UHL 1,663,427

GAS COCK

Filed July 21, 1927

Inventor
Frank L. Uhl

By

Attorney

Patented Mar. 20, 1928.

1,663,427

UNITED STATES PATENT OFFICE.

FRANK L. UHL, OF DETROIT, MICHIGAN.

GAS COCK.

Application filed July 21, 1927. Serial No. 207,327.

The present invention pertains to a novel valve construction, intended particularly for use as a gas cock, wherein a stop washer is used with very little mutilation of the thread at the lower end of the rotatable plug.

In present devices of the type having a washer for determining the end positions of the rotatable plug, it has been found necessary to form facets on the lower end of the plug for the purpose of applying the washer. Such facets necessarily cut the thread considerably and thus weaken the anchorage of the tail-nuts or lock-nuts which retain the spring for drawing the plug tightly into the valve body.

In overcoming this defect I provide the washer with a small internal stop tooth and form a longitudinal groove along the lower end of the valve plug for receiving the tooth so that the washer may be slid into its operative position. At the upper end of the groove, a transverse slot is cut in the plug for receiving the tooth in its final position and also permitting rotation of the plug with respect to the tooth. The stop washer is locked to the valve body, as by means of a lug projecting from the washer into a notch cut in the body, and the stop tooth thereby maintains a fixed position and functions as a stop member when engaged by the wall of the transverse slot.

If the stop tooth is formed at one side of the diameter passed through the lug, reversal of the washer will convert the cock from a righthand to a lefthand member, or vice versa; and such disposition of the stop tooth with respect to the washer and lug constitutes another feature of this invention.

The invention is fully disclosed by way of example in the following description and in the accompanying drawing, in which—

Reference to these views will now be made by use of like characters which are employed to designate corresponding parts throughout.

Figure 1:
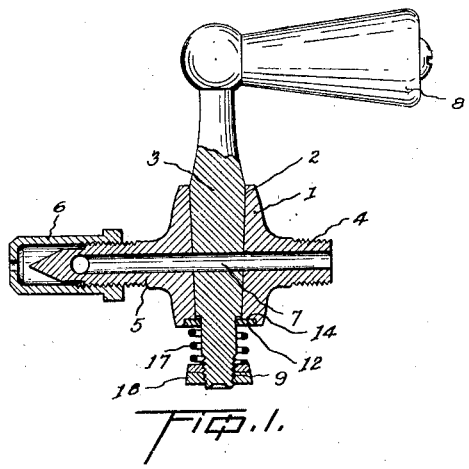
Figure 1 is a longitudinal section of a gas cock constructed according to the invention.
Figure 2:
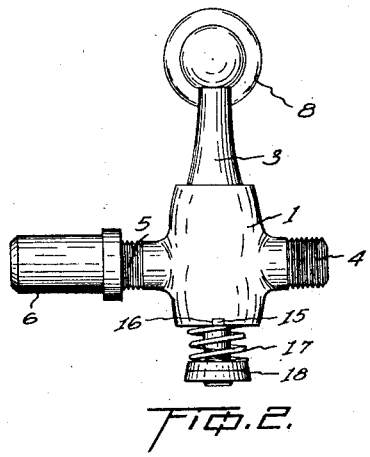
Figure 2 is an elevation thereof showing the same in closed position.

The device to which this invention is applicable is shown for purposes of illustration as a gas cock of the type comprising a body 1 having a tapered plug seat or bore 2 into which is fitted a rotatable plug 3. The body 1 is formed externally with an inlet 4 aligned with an outlet 5 to which is applied a regulator 6 in the usual manner. The plug 3 has a diametrical port 7 adapted to register with the inlet 4 and outlet 5 preferably when the handle 8 is parallel to the inlet and outlet.

The lower end of the valve plug disposed outside the body is threaded as at 9 and has a comparatively small longitudinal groove 10 provided for the purpose presently to be described. At the upper end of this groove and at the lower end of the body is formed a transverse slot 11 in communication with the groove. As illustrated in the present example, the back wall of this slot is a diameter of the plug.

The means for stopping rotation of the plug at the full open and full closed position is a substantially circular washer 12 adapted to slide on the lower end of the plug. The washer has an internally projecting stop tooth 13 adapted to slide in the groove 10 and to enter the slot 11. The washer in its final position is accommodated in a seat 14 cut in the lower edge of the valve body and is provided with an outwardly extending lug 15 receivable in a closely fitting notch 16 also cut in the lower edge of the body 1. The washer is held in its seat and the plug is drawn to a tight fit in the body by means of a spring 17 surrounding the lower end of the plug and retained by tail-nuts or lock-nuts 18 screwed on the threads of the plug.

Figure 3:
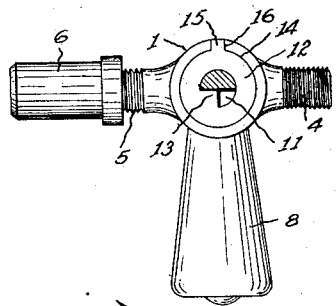
Figure 3 is a bottom plan section showing the cock in closed position and the washer adjusted for a righthand member.
Figure 4:
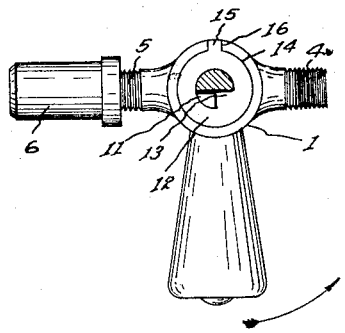
Figure 4 is a similar section showing the washer reversed so that the cock is converted into a lefthand member.
Figure 5:
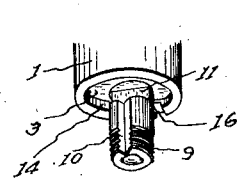
Figure 5 is a detail perspective view of the lower end of the device with the tail-nuts and spring removed.
Figure 7:
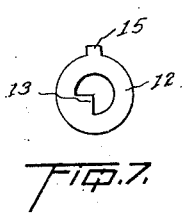
Figure 7 is a plan view of the unsymmetrical washer shown in Figures 3 and 4.
Figure 6:
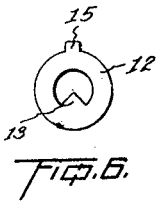
Figure 6 is a plan view of a symmetrical washer.

When the washer is locked with reference to the body by means of the lug 15 lying in the notch 16, the slot 11 permits rotation of the plug to the extent of the angular difference between the slot and the tooth 13. In the present case the slot extends through the diameter or 180°, as already stated, and the sides of the tooth are at right angles to each other, so that the plug is permitted the conventional 90° turn. If the tooth is offset axially from the lug 15, as shown in Figure 7, it is capable of two different positions relatively to the valve body. One of these positions is indicated in Figure 3 wherein the valve may be opened by turning the handle in the direction of the arrow or to the right as viewed from above, thereby constituting a righthand gas cock. In Figure 4 the washer is shown turned over with respect to Figure 3 so that the stop tooth 13 is shifted to the other side of a diameter passed through the notch 16 of the valve body. In this adjustment the movement of the plug from closed to open position is the opposite of that shown in Figure 3, and the direction of the cock is accordingly reversed.

Although a specific embodiment of the invention has been illustrated and described, it will be understood that various alterations in the details of construction may be made without departing from the scope of the invention as indicated by the appended claims.

What I claim is:—

1. A valve construction comprising a body having inlet and outlet means, a ported plug rotatably mounted in said body and adapted to establish or obstruct communication between said inlet and outlet means, said plug having a longitudinal groove at its lower end and a transverse slot communicating with the upper end of the groove, a washer adapted to slide on said plug, a stop tooth projecting inwardly from said washer and adapted to slide through said groove into said slot, and means for locking said washer to said body.

2. A valve construction comprising a body having inlet and outlet means, a ported plug rotatably mounted in said body and adapted to establish or obstruct communication between said inlet and outlet means, said plug having a longitudinal groove at its lower end and a transverse slot communicating with the upper end of the groove, a washer adapted to slide on said plug, a stop tooth projecting inwardly from said washer and adapted to slide through said groove into said slot, an external lug on said washer, said body having a notch in its lower end adapted to lock said lug.

3. A valve construction comprising a body having inlet and outlet means, a ported plug rotatably mounted in said body and adapted to establish or obstruct communication between said inlet and outlet means, said plug having a longitudinal groove at its lower end and a transverse slot communicating with the upper end of the groove, a washer adapted to slide on said plug, a stop tooth projecting inwardly from said washer and adapted to slide through said groove into said slot, and means for locking said washer to said body, said tooth being offset to a position unsymmetrical with said means.

4. A valve construction comprising a body having inlet and outlet means, a ported plug rotatably mounted in said body and adapted to establish or obstruct communication between said inlet and outlet means, said plug having a longitudinal groove at its lower end and a transverse slot communicating with the upper end of the groove, a washer adapted to slide on said plug, a stop tooth projecting inwardly from said washer and adapted to slide through said groove into said slot, an external lug on said washer, said body having a notch in its lower end adapted to lock said lug, said tooth being offset to a position unsymmetrical with said lug.

In testimony whereof I affix my signature.

FRANK L. UHL.